US008213928B2

(12) United States Patent
Rohaly et al.

(10) Patent No.: US 8,213,928 B2
(45) Date of Patent: Jul. 3, 2012

(54) TEST APPARATUS AND METHOD FOR TESTING INTEROPERABILITY OF WIRELESS COMMUNICATION DEVICES

(75) Inventors: Christopher J. Rohaly, Kokomo, IN (US); Phillip W. Kelly, Kokomo, IN (US); Joseph W. Baumgarte, Carmel, IN (US); Charles N. Elwood, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 741 days.

(21) Appl. No.: 12/276,439

(22) Filed: Nov. 24, 2008

(65) Prior Publication Data
US 2010/0130195 A1 May 27, 2010

(51) Int. Cl.
*H04W 24/00* (2009.01)
(52) U.S. Cl. ........ 455/425; 455/423; 455/424; 455/418; 455/419
(58) Field of Classification Search .......... 455/423–425, 455/418, 419
See application file for complete search history.

(56) References Cited

U.S. PATENT DOCUMENTS

| 7,398,083 | B2 * | 7/2008 | Ying | 455/423 |
|---|---|---|---|---|
| 2003/0156549 | A1 * | 8/2003 | Binder et al. | 370/252 |
| 2004/0209612 | A1 * | 10/2004 | Barberis et al. | 455/423 |
| 2006/0223522 | A1 * | 10/2006 | Guo et al. | 455/423 |

* cited by examiner

*Primary Examiner* — Temica M Beamer
(74) *Attorney, Agent, or Firm* — Lawrence D. Hazelton

(57) ABSTRACT

A test apparatus and method are provided for testing interoperability of a first device to communicate with a second device via wireless communication. The test apparatus includes a wireless interface configured to interface via wireless communication with devices. The test apparatus also includes a processor, memory and logic stored in memory and executed by the processor. The logic causes the test apparatus to sequence through a plurality of wireless communication actions to communicate with a first device, monitor behavior of the first device during the actions, and store characteristics of the monitored behavior in memory so that the test apparatus may be used to emulate the first device when wirelessly communicating with a second device.

21 Claims, 5 Drawing Sheets

TEST APPARATUS AND METHOD FOR TESTING INTEROPERABILITY OF WIRELESS COMMUNICATION DEVICES

TECHNICAL FIELD

The present invention generally relates to wireless communications, and more particularly relates to testing the interoperability of devices that communicate wirelessly, such as with Bluetooth® enabled devices.

BACKGROUND OF THE INVENTION

Short range wireless communication is available on many electronic devices, such as cell phones, microphone and earpiece headsets, laptop computers, desktop computers and is also widely available on many vehicles. Many of these wireless devices are configured with a popular wireless communication package, commonly referred to as Bluetooth® devices. Bluetooth® enabled devices are developed and sold by many companies. As a result, the internal implementation of technology employed in the various Bluetooth® enabled products may vary from one product to another. This often results in problems in trying to ensure the operability of one device wirelessly communicating with another device. In order for developers of devices to ensure proper wireless operation, a large scale interoperability test is generally required.

To perform a large scale interoperability test, developers typically hire outside companies or invest in developing an internal capability to manually test software and hardware associated with their devices' ability to interact with existing or prelaunch hardware. Typically, the interoperability testing is conducted manually by operating individual devices communicating wirelessly with a newly-developed product, such as an entertainment system in a vehicle. This requires purchasing a vast number of devices that may communicate with the entertainment system in the marketplace. As a consequence, the conventional interoperability testing approach requires substantial money and time.

It is therefore desirable to provide for interoperability testing between wireless communication devices that makes the testing more feasible and less costly.

SUMMARY OF THE INVENTION

According to one aspect of the present invention, a test apparatus is provided for testing interoperability of a first device to communicate with a second device via wireless communication. The test apparatus includes a wireless interface configured to interface via wireless communication with at least first and second devices. The test apparatus also includes a processor, memory and logic stored in memory and executed by the processor. The logic causes the test apparatus to sequence through a plurality of wireless communication actions to communicate with a first device, monitor behavior of the first device during the actions, and store characteristics of the monitored behavior in memory so that the test apparatus may be used to emulate the first device when wirelessly communicating with a second device.

According to another aspect of the present invention, a method for testing interoperability of a first device to communicate with a second device via wireless communication is provided. The method includes the steps of providing a test apparatus having a wireless interface configured to interface via wireless transmission with at least first and second devices and communicating the test apparatus with at least a first device. The method also includes the steps of causing the test apparatus to sequence through a plurality of wireless communication actions to communicate with the first device, monitoring behavior of the first device during the actions, and storing characteristics of the monitored behavior in memory. The method further includes the steps of emulating the first device with the test apparatus when wirelessly communicating with a second device.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
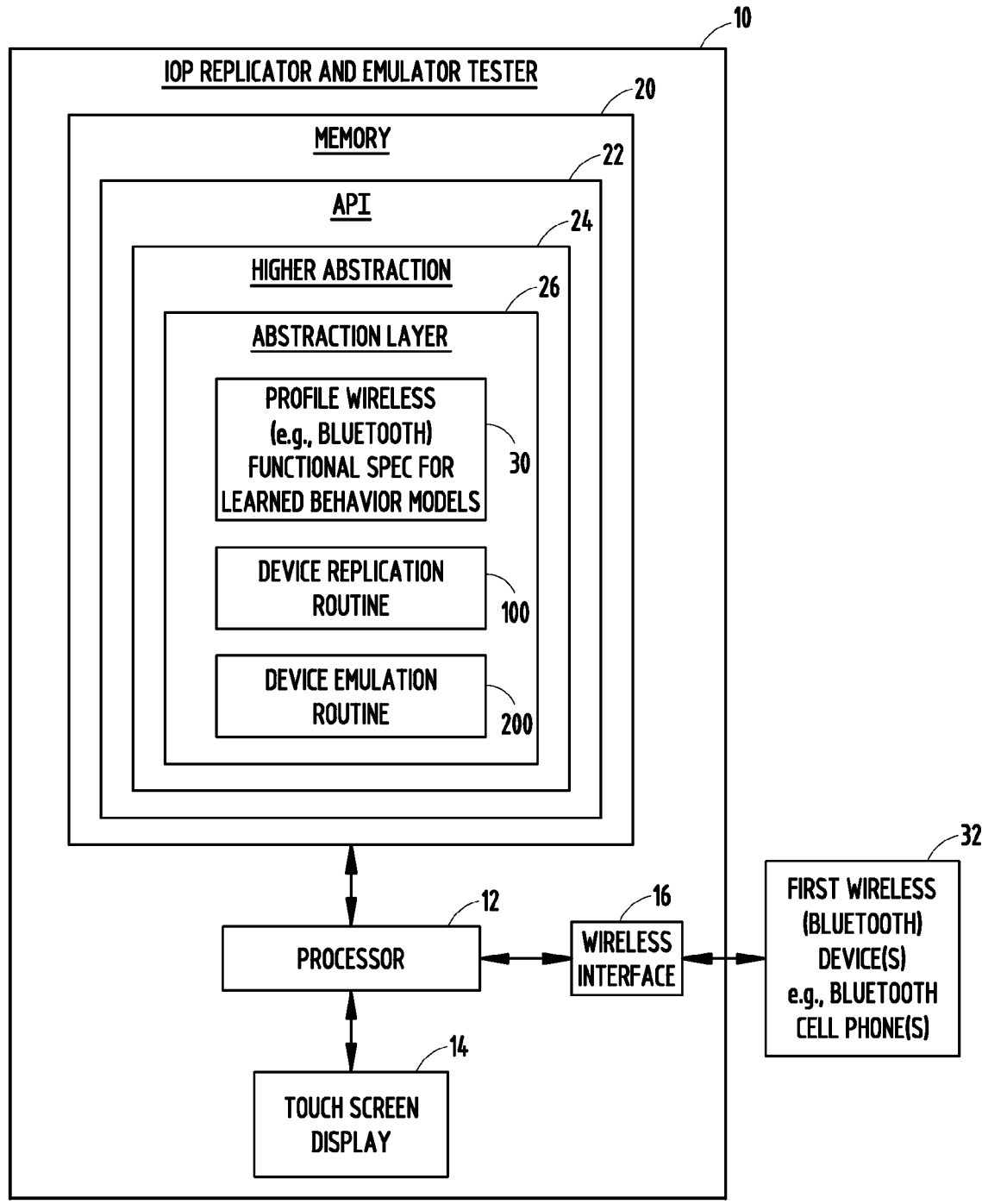
FIG. 1 is a block diagram of a test apparatus shown replicating a first device, e.g., a cell phone, according to one embodiment.
Figure 2:
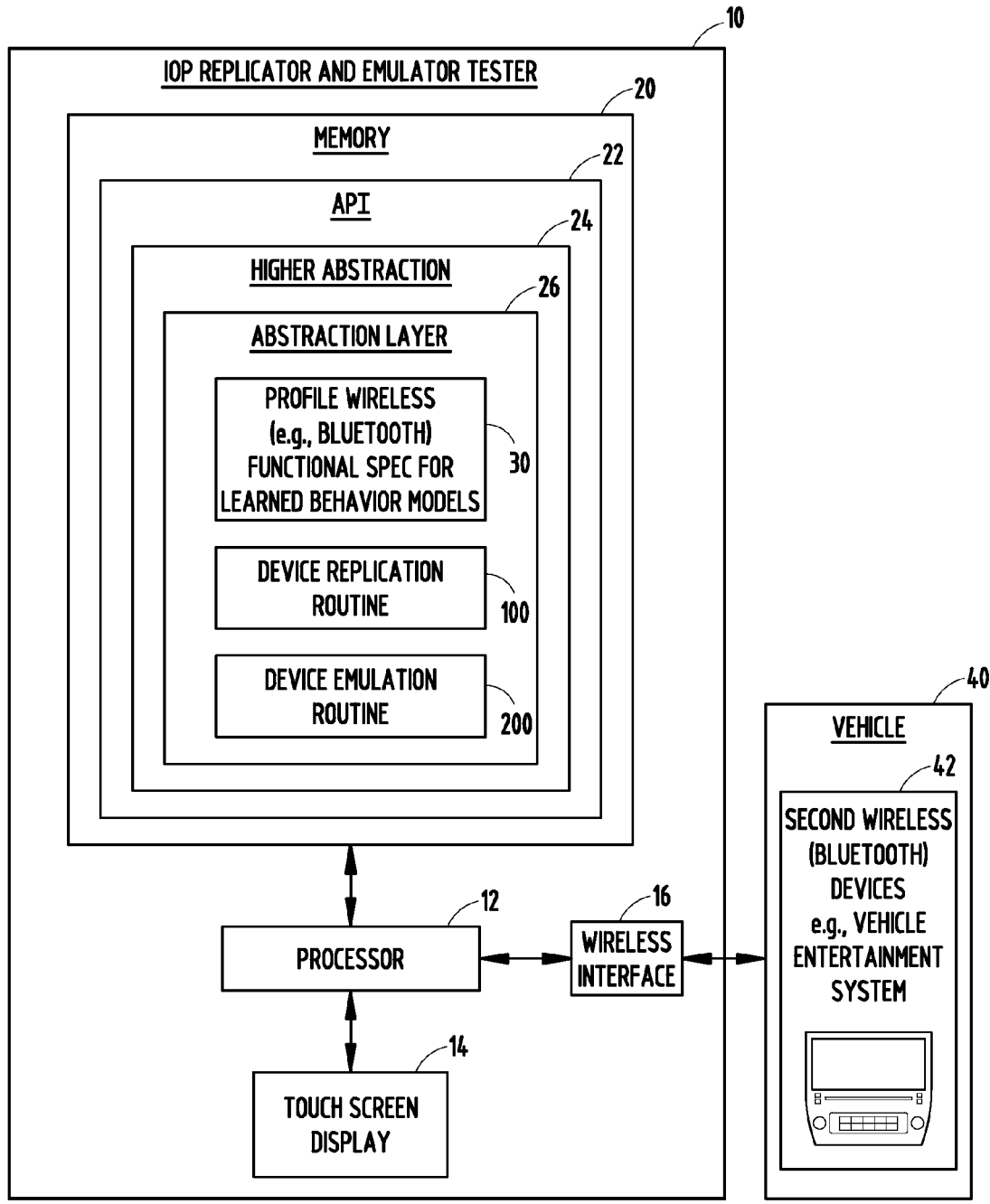
FIG. 2 is a block diagram illustrating the test apparatus configured to emulate the first device (e.g., cell phone) for communication with a second device in a vehicle.
Figure 3:
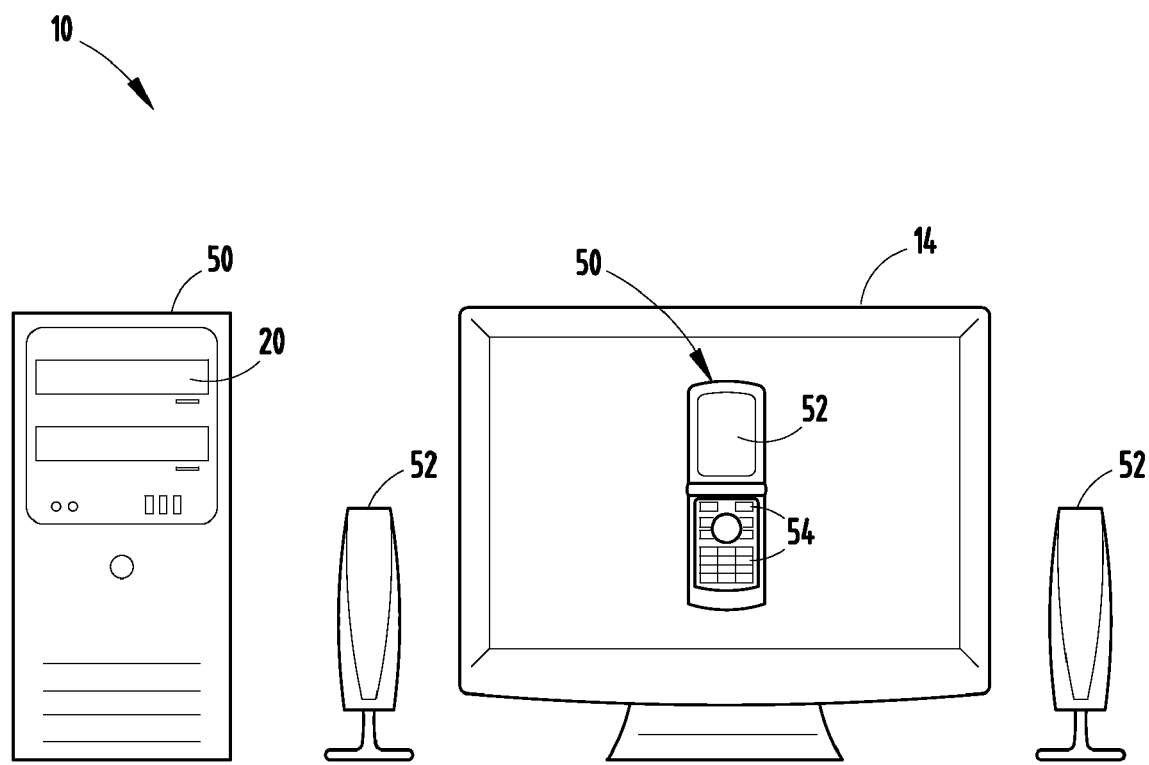
FIG. 3 is a schematic diagram of the user display of the test apparatus showing a cell phone interface for use in simulating the cell phone.

Referring now to FIGS. 1-3, an interoperability (IOP) replicator and emulator tester (also referred to as test apparatus) 10 is illustrated for replicating a first wireless device 32 as shown in FIG. 1 and further emulating the first wireless device 32 when communicating wirelessly with a second device 42 as shown in FIG. 2. The test apparatus 10 is configured to test interoperability of the first device 32 to communicate with the second device 42 via wireless communication. The test apparatus 10 aids in development of future products, such as device 42, without requiring a developer to test each and every first device 32 with the second device 42 that is being developed. The first device 32 may include one or more wireless devices, such as Bluetooth® enabled cell phones, microphone and earpiece headsets, laptop computers, desktop computers and other wireless communicating devices. The second device 42 may include any wireless device capable of communicating wirelessly with one or more of the first devices 32. Examples of a second wireless device 42 may include a Bluetooth® enabled vehicle entertainment system, radio, or other device.

With reference to FIGS. 1-3, the interoperability replicator and emulator test apparatus 10 is shown having a processor 12, a touch screen display 14, a wireless interface 16 and memory 20. The processor 12 may include a microprocessor, according to one embodiment. The processor 12 may include other analog and/or digital circuitry including an application specific integrated circuit (ASIC) or other known circuitry according to other embodiments. The processor 12 processes input data, executes routines as described herein to replicate a first device and to emulate the first device, and provides output signals indicative of the interoperability of the devices.

Memory 20 may include any known storage medium, such as random access memory (RAM), read-only memory (ROM), electrically erasable programmable read-only memory (EEPROM), flash memory and other memory devices. Memory 20 is shown including an application programming interface (API) portion 22 having a higher abstraction layer 24 and an abstraction layer 26 within the higher abstraction layer 24. Stored within the abstraction layer 26 is a profile wireless functional specification for learned behavior models 30. The learned behavior models are learned during the replication of a first device 32 and are stored in memory 20 and provide information relevant to the interoperability of the wireless (e.g., Bluetooth®) communication of the first device 32. It should be appreciated that a plurality of learned behavior models 30 may be stored in memory 20 to accommodate the learned replication of a plurality of first devices 32. Also stored in memory 20 is a device replication routine 100 for learning the behavior models and a device emulation routine 200 for emulating the learned first device 32 when communicating with a second device 42, according to one embodiment. Routines 100 and 200 are stored as logic executable by the processor 12.

The test apparatus 10 is also shown including a wireless interface 16 adapted to interface via wireless communication with a plurality of devices. The wireless interface 16 may allow wireless communication via short range wireless communication such as Bluetooth®, according to one embodiment. According to another embodiment, the wireless interface 16 may allow short range wireless communication via IEEE spec 802.11. It should be appreciated that the wireless interface 16 may allow other wireless communication including medium range and long range wireless communication such as may be experienced with a local area network (LAN) wireless communication.

The test apparatus 10 further includes a touch screen display 14 which may display output visual information to a user and may allow for a user to interface and input information to the test apparatus 10. Referring particularly to FIG. 3, the touch screen display 14 is illustrated displaying the user interface of a first wireless device, shown as a cell phone 50. In this example, the cell phone 50 is displayed on display 14 showing the phone display 52 and user input keypads 54 that may be actuated by a user to input information such as alphanumeric characters for commands. The test apparatus 10 may be configured such that the touch screen display 14 allows the user to simulate the entry of keypad inputs by touching the display 14 on the displayed cell phone device 50 such that the test apparatus 10 may simulate the user interface with a cell phone device. The intuitive user interface display 14 abstracts the sophisticated behavioral model and appears to the user as a cell phone in this example with input buttons for providing user inputs. Also shown in FIG. 3 is the memory 20 provided within a computer housing 50 and speakers 52 that allow for audio output to a user. It should be appreciated that the test apparatus 10 may be configured by employing logic programmed onto a computer as shown in FIG. 3, or may otherwise be configured. In the computer embodiment, the computer-based tool may be a personal computer or a computing platform with the learned behavior models 30, device replication routine 100 and device emulation routine 200 stored in memory.

The replicator and emulator test apparatus 10 serves both as a replicator to learn wireless interoperability of one or a plurality of first devices 32 and as an emulator to emulate the one or plurality of first devices 32 when communicating with a second device 42. The test apparatus 10 is shown communicating with a first wireless device, such as a Bluetooth® enabled cell phone 32 in FIG. 1. In doing so, the test apparatus 10 communicates wirelessly via wireless interface 16 with the first wireless device(s) 32 during execution of the device replication routine 100 and learns the behavior of the first wireless device(s) 32 such that a behavior model having characterization parameters is stored in memory for each first device 32.

Once one or a plurality of first wireless devices 32 have been learned by the test apparatus 10 and their behavior model characterization parameters are stored in memory, the test apparatus 10 may be employed to test interoperability of the first wireless devices 32 with one or more second wireless devices 42 as shown in FIG. 2. In this embodiment, the test apparatus 10 communicates wirelessly via the wireless interface 16 with a second wireless device 42 shown located on board a vehicle 40, according to one embodiment. The vehicle 40 may be a wheeled automotive vehicle as is generally known in the art. The second wireless device 42 may include any of a number of wireless devices that communicate wirelessly. In the embodiment shown, the second wireless device 42 is a vehicle entertainment system shown having a display and user inputs available on board the vehicle 40. The vehicle entertainment system 42 may incorporate any of a number of functions including radio, navigation, and entertainment as should be evident to those skilled in the art. The test apparatus 10 allows a developer of a vehicle or the vehicle's entertainment system to test the interoperability of a plurality of first devices 32, such as cell phones, with the second wireless device 42 to see if the second wireless device 42 properly operates to communicate wireless data with each of the plurality of first devices 32. In doing so, the test apparatus 10 executes the device emulation routine 200 to communicate with the second wireless device 42 to see if the first devices 30 work correctly with the second device 42. This enables a developer of the vehicle entertainment system 24 or the vehicle 40 to test interoperability of the second wireless device 42 with the first wireless device 32 without requiring purchase and use of all potential first devices 32.

Figure 4:
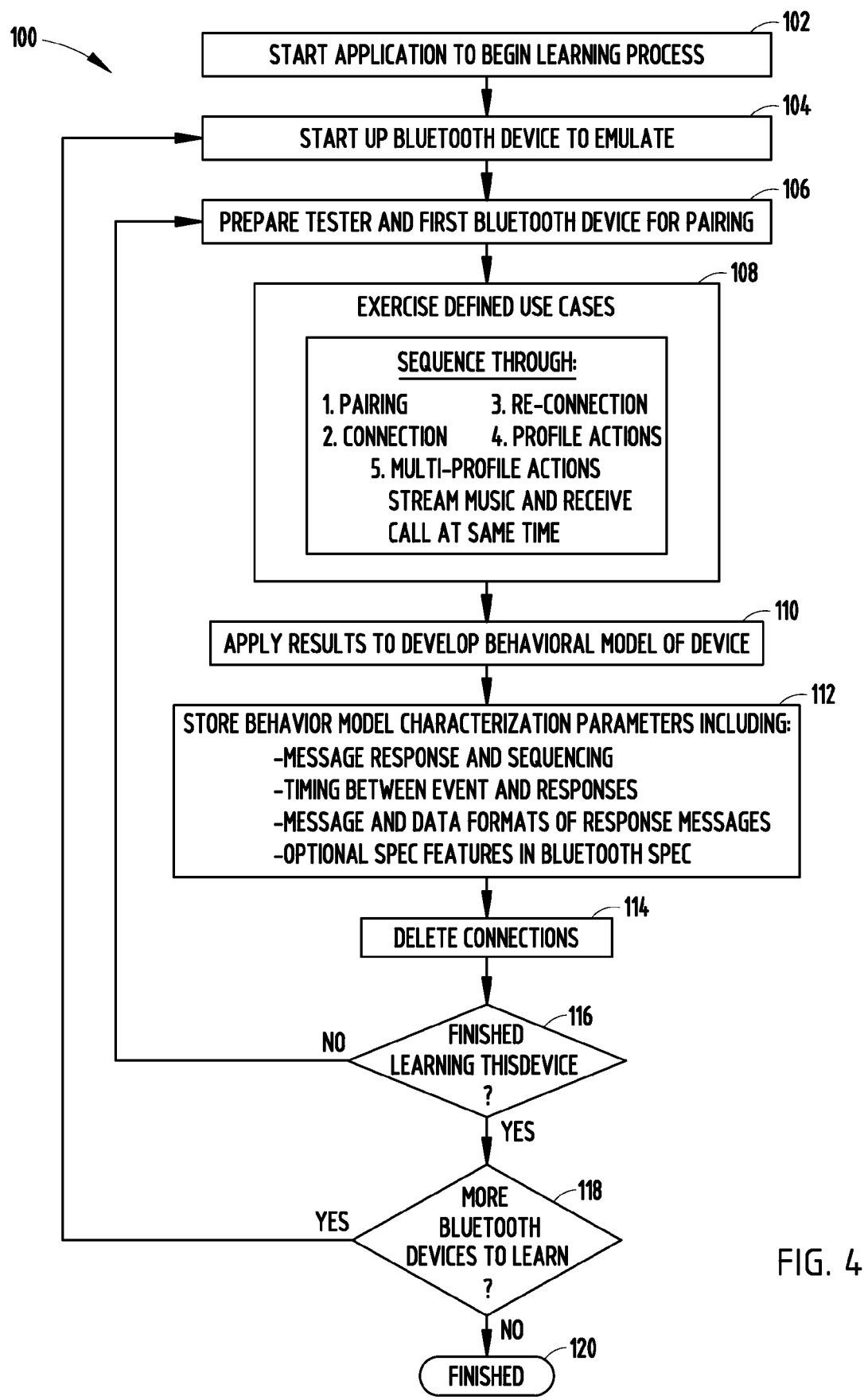
FIG. 4 is a flow diagram illustrating a routine for replicating a first device with the test apparatus, according to one embodiment.

Referring to FIG. 4, the device replication routine 100 is illustrated, according to one embodiment. The replication routine 100 begins at step 102 to start the application to begin the learning process, and then proceeds to step 104 to start up the Bluetooth® enabled first device to emulate. The Bluetooth® enabled device to emulate may include any of a number of devices including cell phones, wireless computers, audio headsets and other Bluetooth® enabled devices or other wireless devices. Next, routine 100 proceeds to step 106 to prepare the test apparatus and the first Bluetooth® enabled device for pairing. The pairing operation may include a conventional pairing in which the devices are configured to communicate with each other, such as entering a matching code (e.g., 0000), as should be evident to those skilled in the art.

Once the test apparatus and the first Bluetooth® enabled device are paired, the replication routine 100 proceeds to step 108 to exercise defined use cases. The use cases may include sequencing through a number of actions involving communication of the test apparatus with each Bluetooth® enabled first device. The sequence of events may include a pairing action, a connection action, a reconnection action, a profile action and multiple profile actions. The use cases typically may be a use that is generally required to exercise use of the device through its full range of behavior. According to one embodiment, the use cases may include a device pairing, a device service connection, a device disconnection and reconnection, and profile actions. The profile actions may be functional steps defined in the present and future Bluetooth® functional profile specifications for profiles including, but not limited to, hands-free phone profile, headset profile, advanced audio distribution profile, audio/video remote control profile, phonebook access profile, object push profile, dial-up networking profile, and other profiles as updated and/or adopted. These actions may be performed multiple times each, in every different valid sequence and by every different valid optional way possible to capture variation by user input. Use cases may also include multiple profile actions which are user actions (or use cases) which require simultaneous use of more than one Bluetooth® profile. Multiple profile actions may include a cell phone streaming music and receiving a call at the same time.

Based on the defined use cases, routine 100 may apply the results to develop a behavior model of the first device in step 110. The behavior model may then be stored in memory in step 112. The characterization parameters of the behavior model may include message response and sequencing, timing between event and responses, message and data formats of response messages, and optional specification features in the Bluetooth® specification. The stored behavior model characterization parameters are indicative of the operability of the first wireless device such that the test apparatus is able to emulate the first device. Once the characterization parameters are stored in memory, the replication routine 100 deletes the connection at step 114. Next, routine 100 proceeds to decision step 116 to determine if the test apparatus is finished learning this first device and, if not, turns to step 106. If the test apparatus is finished learning this first device, then replication routine 100 proceeds to decision step 118 to determine if more Bluetooth® enabled devices are to be learned and, if so, returns to step 104 to emulate therein the next first device. If no more Bluetooth® enabled devices are to be learned as the first device, then replication routine 10 is finished with the replication process at step 120.

Figure 5:
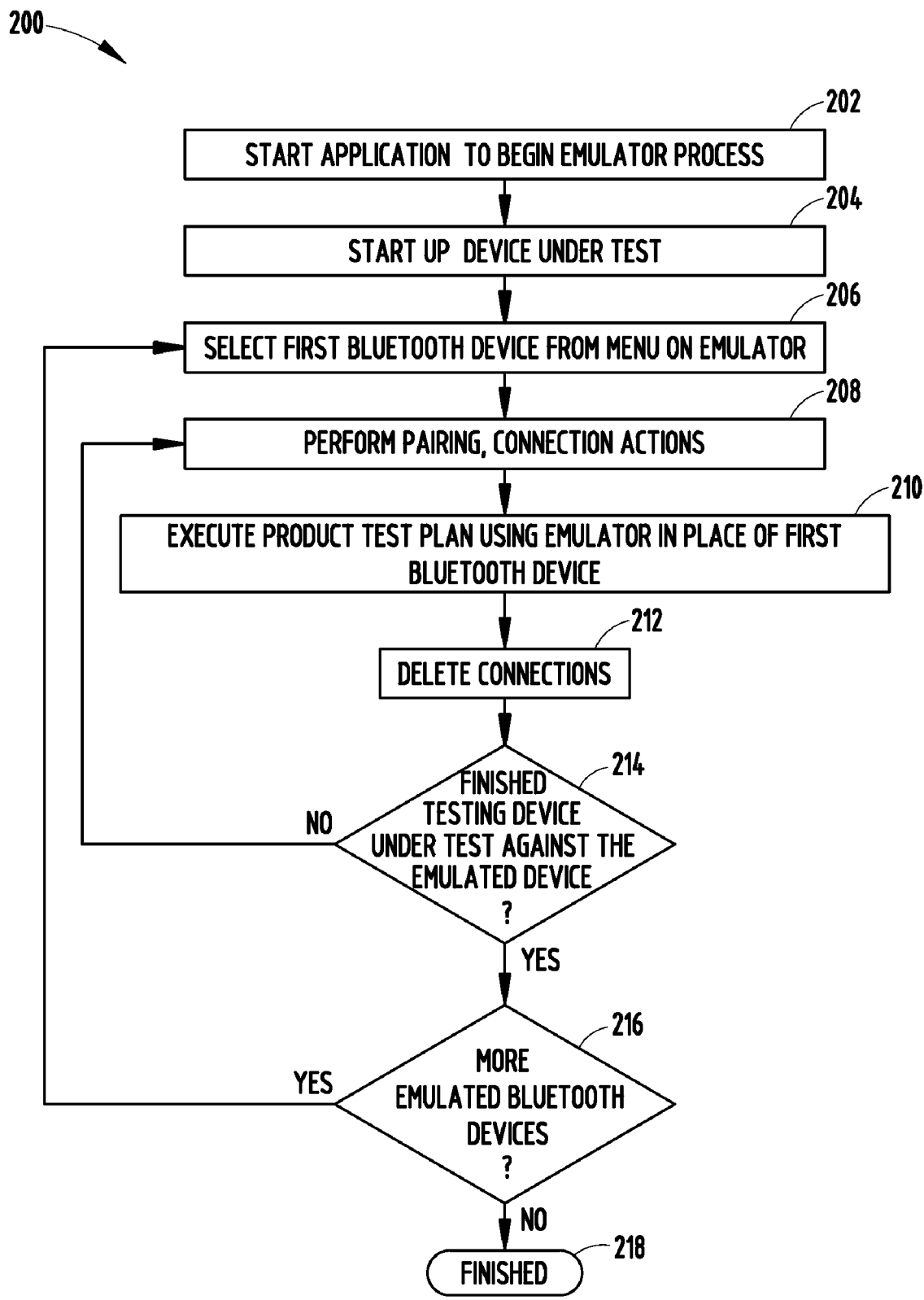
FIG. 5 is a routine for emulating the first device when communicating with a second device, according to one embodiment.

Referring to FIG. 5, the emulation routine 200 is illustrated for the test apparatus emulating the first devices to communicate with a second wireless device, according to one embodiment. The emulation routine 200 begins at step 202 to start the application to begin the emulator process, and then proceeds to step 204 to start up the second device under test. The second device under test may include an entertainment system in a vehicle, according to one embodiment. Emulation routine 200 proceeds to step 206 to select a first Bluetooth® enabled device from a menu on the display of the emulator test apparatus at step 206. This may include a user actuating the touch screen display button on the test apparatus to select a desired first Bluetooth® enabled device to test with the second device. Next, routine 200 proceeds to step 208 to perform pairing and connection actions.

Once the pairing and connection actions are complete, emulation routine 200 proceeds to step 210 to execute a product test plan using the emulator in place of the first Bluetooth® enabled device. The product test plan may include the user interacting with the touch screen display of the test apparatus to enter certain inputs so that the test apparatus may check the interoperability of the first device with the second device. Once the product test plan is complete, emulation routine 200 proceeds to step 212 to delete the connections. At decision step 214, emulation routine 200 determines whether the test apparatus is finished testing the second device under test against the emulated first device and, if not, returns to step 208. If the test apparatus is finished testing the second device under test against the emulated first device, then routine 200 proceeds to decision step 216 to determine if more emulated Bluetooth® enabled devices are to be emulated to test with the second device under test and, if so, returns to step 206 to emulate the next first device. If no more emulated first devices are to be emulated, emulation routine 200 is complete at step 218.

The emulation routine 200 executes the product test plan by interacting with a user, according to one embodiment. The test procedure for executing the product text plan may include any of a number of actions that are performed to test interoperability of one or a plurality of first devices with a second device. One example of a test procedure for testing each of the plurality of first devices with the second device is described in the following table which provides the Bluetooth® profile, the requirement, the test procedures implemented and the expected results, which are recorded for each device that is emulated:

| Bluetooth ® Profile | Requirement | Test Step | Test Procedures | Expected Results |
|---|---|---|---|---|
| Registration | | | | |
| HFP | Pair | 1 | Press Talk button. After beep, say "setup" | Setup message is played |
| HFP | Pair | 2 | Press Talk button. After beep, say "Phone Setup" | Phone Setup message is played |
| HFP | Pair | 3 | Press Talk button. After beep, say "Pair Phone" | Pair Phone message is played |
| HFP | Pair | 4 | Press Talk button. After beep, state a name for the phone. | Confirm Name message player |
| HFP | Pair | 5 | Press Talk button. After beeps, say "Confirm" | Handsfree and Passkey messages are played |
| HFP | Pair/Invalid Passkey | 6 | Begin device search on BT phone. After search, select "Handsfree?" and enter an invalid Passkey (PIN) | TSA plays a Pair error Prompt? Verify BT Phone is not connected to TSA. |
| HFP | Pair/Valid Passkey | 7 | Repeat steps 3-6 and enter the correct Passkey(PIN) | Paired Phone message is played. "Paired" is displayed on radio and Bluetooth icon will be highlighted. |

-continued

| Bluetooth ® Profile | Requirement | Test Step | Test Procedures | Expected Results |
|---|---|---|---|---|
| HFP | Pair | 8 | Press Talk button. After beep, say "Cancel" | Cancelled message is played. Return to last audio mode. |
| | | | Connectivity | |
| HFP | Disconnect ACC off | 1 | Turn ACC off. | TSA disconnected to BT phone. Bluetooth Icon is NOT highlighted. |
| HFP | Reconnect ACC on | 2 | Turn ACC on. | TSA reconnects to BT Phone. Bluetooth Icon is highlighted. |
| HFP | Disconnect BT/Phone power | 3 | Turn Bluetooth or Power off on the phone. | BT phone is disconnected from TSA. Bluetooth Icon is NOT highlighted. |
| HFP | Reconnect BT/Phone power | 4 | Turn Bluetooth or Power back on. Do search from BT phone for TSA. | TSA reconnects to BT phone. Bluetooth Icon is highlighted. |
| HFP | Disconnected out of Range | 5 | Move Bluetooth phone out of range from TSA | BT phone is disconnected from TSA. Bluetooth Icon is NOT highlighted |
| HFP | Reconnect in Range | 6 | Move Bluetooth phone back in range of TSA | TSA reconnects to BT phone. Bluetooth Icon is highlighted |
| HFP | Disconnect from BT Phone | 7 | Disconnect the TSA from the BT phone | BT phone is disconnected from TSA. Bluetooth Icon is NOT highlighted |
| HFP | Reconnect from BT Phone | 8 | Reconnect to TSA from the BT Phone | TSA reconnects to BT phone. Bluetooth Icon is highlighted. |
| HFP | Disconnect Switch BT Phone | 9 | Another phone is paired with TSA. Press Talk button and say "setup." Press Talk button and say "Phone Setup." Press Talk button and say "Select Phone." Press Talk button and say name of the other phone. Press Talk button and say "Confirm." | TSA disconnects from the current BT phone and connects with the other BT phone. |
| HFP | Reconnect Switch BT Phone | 10 | Repeat previous Test Procedure to reconnect to previous BT phone (Phone under test) | TSA disconnects from the current BT phone and connects with the original BT phone. |
| HFP | Disconnect Delete Paired Phone | 11 | Turn power off of all paired BT phones, except phone under test. Press Talk button and say "Setup." Press Talk button and say "Phone Setup." Press Talk button and say "Delete Phone." Press Talk button and state the name of the test phone. Press Talk button and say "Confirm." | TSA disconnects from the current BT phone. Bluetooth Icon is NOT highlighted |
| | | | Place Call | |
| HFP | Dial by Number | 1 | Press Talk button. After beep, say "Dial by Number." Press Talk button and state a valid phone number. Press Talk button and say "Dial." | Phone on far-end rings. Answer phone on far-end. Call is on the VAS |
| HFP | Hangup Far-end | 2 | Hangup the phone on the far-end | Call is terminated and audio system |

-continued

| Bluetooth ® Profile | Requirement | Test Step | Test Procedures | Expected Results |
|---|---|---|---|---|
| | | | | returns to previous state |
| HFP | Dial by Name | 3 | Press Talk button. After beep, say "Dial by Name." Press Talk button and state a valid stored name. Press Talk button and say "Dial." | Phone on far-end rings. Answer phone on far-end. Call is on the VAS |
| HFP | Hangup far-end | 4 | Hangup the phone on the far-end | Call is terminated and audio system returns to previous state. |
| HFP | Dial <Name> | 5 | Press Talk button. After beep, say "Dial <Name>." Press Talk button and say "Dial." | Phone on far-end rings. Answer phone on far-end. Call is on the VAS |
| HFP | Hangup far-end | 6 | Hangup the phone on the far-end | Call is terminated and audio system returns to previous state |
| HFP | Dial <Number> | 5 | Press Talk button. After beep, say "Dial <Number>." Press Talk button and say "Dia." | Phone on far-end rings. Answer phone on far-end. Call is on the VAS. |
| HFP | Hangup far-end | 6 | Hangup the phone on the far-end | Call is terminated and audio system returns to previous state |
| HFP | Redial | 7 | Press Talk button. After beep, say "Redial." Press Talk button and say "Dial." | Phone on far-end rings. Answer phone on far-end. Call is on the VAS |
| HFP | Hangup far-end | 8 | Hangup the phone on the far-end | Call is terminated and audio system returns to previous state |
| HFP | Speed Dial | 9 | Press Off-Hook SWC. Press one of the radio presets that has a stored number. | Phone on far-end rings. Answer phone on far-end. Call is on the VAS |
| HFP | Hangup far-end | 10 | Hangup the phone on the far-end | Call is terminated and audio system returns to previous state |
| HFP | Dial thru Phonebook | 11 | Press Talk button. After beep, say "Phonebook." Press Talk button and say "List Names." Press Off-Hook SWC when name is played. | Phone on far-end rings. Answer phone on far-end. Call is on the VAS. |
| HFP | Hangup far-end | 12 | Hangup the phone on the far-end | Call is terminated and audio system returns to previous state |
| HFP | Callback | 13 | Place a call to the BT phone. Hangup call. Press Talk button. After beep, say "Callback." Press Talk button and say "Dia." | Phone on far-end rings. Answer phone on far-end. Call is on the VAS |
| HFP | Hangup far-end | 14 | Hangup the phone on the far-end | Call is terminated and audio system returns to previous state |
| HFP | Dial by BT phone | 15 | Enter a phone number using the BT phone handset. Press Send button on phone. | Phone on far-end rings. Answer phone on far-end. Call is on the VAS |
| HFP | Hangup far-end | 16 | Hangup the phone on the far-end | Call is terminated and audio system returns to previous state. |
| | | | Receive/End Call | |
| HFP | Auto Answer | 1 | Turn BT phone Auto Answer on. Place a call to the BT phone. | Ringing is heard through the VAS. Incoming call is answered and call is on the VAS. |

-continued

| Bluetooth ® Profile | Requirement | Test Step | Test Procedures | Expected Results |
|---|---|---|---|---|
| HFP | Hangup far-end | 2 | Hangup the phone on the far-end | Call is terminated and audio system returns to previous state |
| HFP | Auto Answer Flip phones | 3 | Turn BT phone Auto answer off. Turn on answer call when phone is opened. Place a call to the BT phone. Flip open the BT phone. | Call is answered and is on the VAS |
| HFP | Hangup far-end | 4 | Hangup the phone on the far-end | Call is terminated and audio system returns to previous state |
| HFP | Answer Off-Hook SWC | 5 | Turn BT phone Auto Answer off. Place a call to the BT phone. | Ringing is heard through the VAS. Call is not automatically answered. |
| HFP | Answer Off-Hook SWC | 6 | Press the off-hook SWC button. | Incoming call is answered and call is on the VAS |
| HFP | Terminate Call On-Hook SWC | 7 | Press the on-hook SWC button. | Call is terminated and audio system returns to previous state |
| HFP | Answer BT Phone Send | 8 | Place a call to the BT phone. | Ringing is heard through the VAS |
| HFP | Answer BT Phone Send | 9 | Press the Send button on BT phone handset. | Incoming call is answered and call is on the VAS |
| HFP | Terminate Call BT Phone End | 10 | Press the End button on BT phone handset. | Call is terminated and audio system returns to previous state. |
| HFP | Reject On-Hook SWC | 11 | Place a call to the BT phone. | Ringing is heard through the VAS |
| HFP | Reject On-Hook SWC | 12 | Press the on-hook SWC button. | Incoming call is dropped and call is not on the VAS. Audio system returns to previous state. |
| HFP | Reject BT Phone End | 13 | Place a call to the BT phone. | Ringing is heard through the VAS. |
| HFP | Reject BT Phone End | 14 | Press the End button on BT phone handset | Incoming call is dropped and call is not on the VAS. Audio system returns to previous state. |
| HFP | Call ended from loss of cell phone signal | 15 | Place a call to the BT phone. Answer call. Cause the BT phone to lose connection with tower, without losing BT connection. | Call is terminated and audio system returns to previous state |

Mute Call

| Bluetooth ® Profile | Requirement | Test Step | Test Procedures | Expected Results |
|---|---|---|---|---|
| HFP | Mute Call | 1 | Place a call to the BT phone. Answer call. Press Talk button and say "Mute." | Call is muted. Verify call stays muted for one minute. |
| HFP | Unmute Call | 2 | Press Talk button and say "Mute" | Call is unmuted. Call is on the VAS |

DTMF Tones

| Bluetooth ® Profile | Requirement | Test Step | Test Procedures | Expected Results |
|---|---|---|---|---|
| HFP | DTMF tones using HF | 1 | Place a call to the BT phone. Answer call. Press Talk button and state an eight digital number. Press Talk button and say "Send." | DTMF tones are played over the VAS |
| HFP | DTMF tones using | 2 | Still in call, press another eight digit number using the | DTMF tones are played over the |

-continued

| Bluetooth ® Profile | Requirement | Test Step | Test Procedures | Expected Results |
|---|---|---|---|---|
| | BT phone | | BT phones keypad Transfer | VAS |
| HFP | Place Call | 1 | Place a HF call. Answer call on far-end | Call is on the VAS |
| HFP | Transfer to private mode using phone | 2 | On BT handset, transfer the call to private mode | Call is transferred to BT handset and audio system returns to previous state |
| HFP | Transfer to handsfree mode using phone | 3 | On BT handset, transfer the call to handsfree mode | Call is transferred from BT handset to HF. Call is on the VAS |
| HFP | Transfer to private mode using "Transfer" | 4 | Press Talk button. After beeps, say "Transfer." | Call is transferred to BT handset and audio system returns to previous state. |
| HFP | Transfer to handsfree mode using "Transfer" | 5 | Press Talk button. After beeps, say "Transfer." | Call is transferred from BT handset to HF. Call is on the VAS. |
| HFP | Transfer to private mode using "Transfer" | 6 | Press Talk button. After beeps, say "Transfer." | Call is transferred to BT handset and audio system returns to previous state. |
| HFP | Transfer to handsfree mode using Off-Hook SWC | 7 | Press the off-hook SWC button. | Call is transferred from BT handset to HF. Call is on the VAS. |
| | | | Indicator Displays | |
| HFP | BT Icon | 1 | Paired phone is connected | Bluetooth Icon is highlighted. |
| HFP | Antenna Signal Strength | 2 | Paired phone is connected. | Antenna Signal Strength is displayed |
| HFP | Battery level | 3 | Paired phone is connected | Battery Level is displayed |
| HFP | Roaming Indicator | 4 | Paired phone is connected and roaming | Roaming Indicator is displayed |
| | | | Third Call/Call Waiting | |
| HFP | Answer Off-Hook SWC | 1 | Place a call to the BT phone. Press the off-hook SWC button when it rings | Incoming call is answered and call is on the VAS. |
| HFP | Reject Second Incoming Call | 2 | Place a second call to the BT phone. Press the on-hook SWC button when it rings. | Second call is rejected and first call is still on the VAS. |
| HFP | Answer Second Incoming Call | 3 | Place a second call to the BT phone. Press the off-hook SWC button when it rings | Second call is answered and on the VAS. First call is placed on hold. |
| HFP | Place Second Call on Hold | 4 | Press off-hook SWC button | Second call is placed on hold and first call is active call and is on the VAS. |
| HFP | Place First Call on Hold | 5 | Press off-hook SWC button. | First call is placed on hold and second call is active call and is on the VAS. |
| HFP | Terminate second call | 6 | Press on-hook SWC button. | Second call is terminated. Phone may auto switch back to first call. If auto switch occurs, first call will be active and on VAS. |
| HFP | Switch Back to First Call | 7 | If auto switch does not occur, press the off-hook SWC button. A ring back tone may be played. | First call becomes the active call and is on the VAS. |
| HFP | Answer Second | 8 | If auto switch does not occur, place a second call | Second call is answered and on the |

-continued

| Bluetooth ® Profile | Requirement | Test Step | Test Procedures | Expected Results |
|---|---|---|---|---|
| | Incoming Call | | to the BT phone. Press the off-hook SWC button when it rings. | VAS. First call is placed on hold. |
| HFP | Terminate Second Call | 9 | If auto switch does not occur, press on-hook SWC button. | Second call is terminated. |
| HFP | Terminate call on hold (first call) | 10 | If auto switch does not occur, press the on-hook SWC button. A ring back tone may be played. | First call is terminated and audio system returns to previous state. |
| | | | Phonebook Transfer | |
| HFP | Phonebook Entry Added by BT phone | 1 | Press Talk button. After beep, say "Phonebook." Press Talk button and say "Add Entry." Press Talk button and say "By Phone." Press Talk button and say "Confirm." Send the Phonebook entry from the BT phone. | Phonebook entry is received by TSA. First phone number is stated by the TSA and is on the displayed. |
| HFP | Next Phone number | 2 | Press Talk button. After Beep, say "Next." | Second phone number is stated by the TSA and is on the displayed. |
| HFP | Previous Phone Number | 3 | Press Talk button. After beep, say "Previous." | First phone number is stated by the TSA and is on the displayed. |
| HFP | Phonebook Entry has been stored | 4 | Press Talk button. After beep, say "Confirm." Press the Talk button and state a name for this entry. Press the Talk button and say "Confirm." Press the Talk button and say "List Phones." | Verify the BT phonebook entry has been added to the TSA phonebook (number displayed is correct). |
| | | | Handsfree On/Off | |
| HFP | Handsfree Power Off | 1 | Press Talk button and say "Setup." Press Talk button and say "Phone Setup." Press Talk button and say "Handsfree Power." Press Talk button and say "Turn Off." | Handsfree power has been turned off. |
| HFP | Handsfree Power Off | 2 | | Verify none of these functions are available due to the Handsfree power has been turned off. |
| HFP | Handsfree Power On | 3 | Press Talk button and say "Setup." Press Talk button and say "Phone Setup." Press Talk button and say "Handsfree Power." Press Talk button and say "Turn On." | Handsfree power has been turned on. |
| HFP | Handsfree Power On | 4 | | Verify these functions are available due to the Handsfree power has been turned on. |
| | | | A2DP Registration | |
| A2DP | Pair | 1 | Press Talk button. After beep, say "Setup." | Setup message is played. |
| A2DP | Pair | 2 | Press Talk button. After beep, say "Bluetooth Audio Setup." | Phone Setup message is played |
| A2DP | Pair | 3 | Press Talk button. After Beep, say Pair Audio." | Pair Phone message is played. |
| A2DP | Pair | 4 | Press Talk button. After Beep, say "Test Audio Device." | Confirm Name message played. |

-continued

| Bluetooth ® Profile | Requirement | Test Step | Test Procedures | Expected Results |
|---|---|---|---|---|
| A2DP | Pair | 5 | Press Talk button. After beeps, say "Confirm." | Handsfree and Passkey messages are played. |
| A2DP | Pair | 6 | Begin device search on BT Audio Device. After search, select "???" and enter Passkey (PIN), if available. Not all audio players will have display or way to enter PIN | Paired Device message is played. "Paired" is displayed on radio and Bluetooth Icon will be highlighted. Music Note is highlighted. |
| A2DP | Pair | 7 | Press Talk button. After beep, say "Cancel." | Cancelled message is played. Return to last audio mode. |
| | | | A2DP Connection | |
| A2DP | Disconnect | 1 | Turn ACC off. | BT audio device is disconnected from TSA. Bluetooth Icon is NOT highlighted. Music Note is NOT highlighted. |
| A2DP | Reconnect | 2 | Turn ACC on. | TSA reconnects to BT audio device. Bluetooth Icon is highlighted. Music Note is highlighted. |
| A2DP | Disconnected Power/BT Off | 3 | Turn Bluetooth or Power off on the Audio device. | BT audio device is disconnected from TSA. Bluetooth Icon is NOT highlighted. Music Note is NOT highlighted. |
| A2DP | Reconnect Power/BT On | 4 | Turn Bluetooth or Power back on. | TSA reconnects to BT audio device. Bluetooth Icon is highlighted. Music Note is highlighted. |
| A2DP | Disconnect Out of Range | 5 | Move Bluetooth audio device out of range from TSA | BT audio device is disconnected from TSA. Bluetooth Icon is NOT highlighted. Music Note is NOT highlighted. |
| A2DP | Reconnect in Range | 6 | Move Bluetooth audio device back in range of TSA | TSA reconnects to BT audio device. Bluetooth Icon is highlighted. Music Note is highlighted. |
| A2DP | Disconnect TSA Switch to another device | 7 | Another Audio Device is paired to TSA. Press Talk button and say "Setup." Press Talk button and say "Bluetooth Audio Setup." Press Talk button and say "Select Audio Player." Press Talk button and state the name of the other audio device. Press Talk button and say "Confirm." Press Talk button and say "From Car." Press Talk button and say "Confirm." TSA begins searching for other audio device. | TSA disconnects from the current BT audio device and connects with the other BT audio device. |
| A2DP | Reconnect TSA Switch to original device | 8 | Repeat previous Test Procedure to reconnect to previous BT Audio Device (Audio Device under test) | TSA disconnects from the current BT audio device and connects with the original BT audio device. |
| A2DP | Disconnect Second | 9 | Another Audio Device is paired to TSA. Press Talk | TSA disconnects from the current BT |

| Bluetooth ® Profile | Requirement | Test Step | Test Procedures | Expected Results |
|---|---|---|---|---|
| | Audio device connects to TSA | | button and say "Setup." Press Talk button and say "Bluetooth Audio Setup." Press Talk button and say "Select Audio Player." Press Talk button and state the name of the other audio device. Press Talk button and say "Confirm." Press Talk button and say "From Audio." Press Talk button and say "Confirm." TSA waits for audio device. On other audio device, connect to the TSA. | audio device and connects with the other BT audio device. |
| A2DP | Reconnect Original Audio Device connects to TSA | 10 | Repeat previous Test Procedure to reconnect to previous BT Audio Device (Audio Device under test) | TSA disconnects from the current BT audio device and connects with the original BT audio device. |
| A2DP | Disconnect Delete Paired Phone | 11 | Turn power off of all paired BT Audio, except phone under test. Press Talk button and say "Setup." Press Talk button and say "Bluetooth Audio Setup." Press Talk button and say "Delete Phone." Press Talk button and state the name of the test BT Audio Device. Press Talk button and say "Confirm." | TSA disconnects from the current BT Audio Device. Bluetooth Icon is NOT highlighted. Music Note is NOT highlighted. |
| | | | AVRCP | |
| AVRCP | Play | 1 | Press Play button on TSA | Audio from the BT Audio Device is playing on the VAS. |
| AVRCP | Stop | 2 | Press Stop button on TSA | Audio from the BT Audio Device is not playing on the VAS. Device may continue playing from the spot of the stop, or start at the beginning of the song. |
| AVRCP | Play | 3 | Press Play button on TSA | Audio from the BT audio device is playing on the VAS. |
| AVRCP | Pause | 4 | Press Pause button on TSA | Audio from the BT audio device is not playing on the VAS. |
| AVRCP | Play | 5 | Press Play button on TSA | Audio from the BT audio device is playing on the VAS. Device should continue playing from the spot of the Pause. |
| AVRCP | Fast Forward | 6 | Press Fast Forward button on TSA. Release after a few seconds. | Current song is Fast Forward on BT audio device. |
| AVRCP | Rewind | 7 | Press Rewind button on TSA. Release after a few seconds. | Current song is Rewind on BT audio device. |
| AVRCP | Forward | 8 | Press and Release Forward (Next) button on TSA. | BT audio device changes to the next song. |
| AVRCP | Backward | 9 | Press and Release Backward (Previous) button on TSA. | BT audio device changes to the previous song. |

The test procedure may be interactive in which a user interfaces with the touch screen display to input actions pursuant to the test procedure. It should be appreciated that some of the test procedure actions may be automated and that the expected results may be automatically stored in memory and may be processed to determine whether the interoperability of each first device with the second device performs satisfactory. One example of a test procedure is given which includes actions for registration, connectivity, placing a phone call, receiving or ending a call, muting a call, providing tones, transfer function, indicator displays, third call/call waiting, phonebook transfers, handsfree on/off actions, registrations, and other actions. It should be appreciated that these and other actions may be applied for any given test procedure, depending upon the functionality of the devices and the expected interoperability of the devices. It should be appreciated that while the test procedure shown and described herein is one example of testing a first device with a second device by emulating the first device. It should be appreciated that the same or similar test procedure may be employed during the replication process to learn the characteristics of each of a plurality of first devices by performing similar actions and storing these characteristics in the test apparatus.

Accordingly, it should be appreciated that the test apparatus 10 advantageously learns the behavior characteristics of a plurality of wireless first devices and emulates the plurality of wireless first devices when communicating with a second device so as to allow for enhanced interoperability testing. The test apparatus 10 advantageously allows for the elimination of physical first devices when testing a second device so that a developer, such as a manufacturer of a vehicle or a device employed based on an automotive vehicle, may easily and cost effectively check the interoperability of their devices.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A test apparatus for testing interoperability of a first device to communicate with a second device via wireless communication, said test apparatus comprising:
   a wireless interface configured to interface via wireless communication with at least first and second devices;
   a processor;
   memory; and
   logic stored in memory and executed by the processor, said logic causing the test apparatus to sequence through a plurality of wireless communication actions to communicate with a first device, monitoring behavior of the first device during the actions, and storing characteristics of the monitored behavior in memory so that the test apparatus may be used to emulate the first device when wirelessly communicating with a second device.

2. The test apparatus as defined in claim 1, wherein the test apparatus further communicates with a second device and emulates the first device such that the interoperability of the first device wirelessly communicates with the second device so that the second device can be tested.

3. The test apparatus as defined in claim 1, wherein the monitored behavior of the first device comprises message response, timing between event and response and message in data formats.

4. The test apparatus as defined in claim 3, wherein the emulation comprises a comparing the message response, timing variation and message and data formatting of the first device to the second device.

5. The test apparatus as defined in claim 1, wherein the wireless communication comprises a Bluetooth® communication.

6. The test apparatus as defined in claim 1, wherein the characteristics of the monitored behavior are stored in an abstraction layer of the memory.

7. The test apparatus as defined in claim 1, wherein the second device comprises a vehicle device.

8. The test apparatus as defined in claim 7, wherein the vehicle device comprises a vehicle entertainment system.

9. The test apparatus as defined in claim 1, wherein the logic further performs a pairing operation to communicate the test apparatus with the first device and further performs a plurality of actions.

10. The test apparatus as defined in claim 1, wherein the first device comprises a cell phone.

11. The test apparatus as defined in claim 1, wherein the test apparatus comprises a display, wherein the display provides an interface substantially similar to an interface on the first device so that a user may interface with the second device via the display to emulate the first device.

12. A method for testing interoperability of a first device to communicate with a second device via wireless communication, said method comprising the steps of:
   providing a test apparatus having a wireless interface configured to interface via wireless transmission with at least first and second devices;
   communicating the test apparatus with at least a first device;
   causing the test apparatus to sequence through a plurality of wireless communication actions to communicate with the first device;
   monitoring behavior of the first device during the actions;
   storing characteristics of the monitored behavior in memory; and
   emulating the first device with the test apparatus when wirelessly communicating with a second device.

13. The method as defined in claim 12 further comprising the step of emulating the first device with the test apparatus when communicating with the second device so that the interoperability of the first device wirelessly communicating with the second device can be tested.

14. The method as defined in claim 12, wherein the step of storing characteristics of the monitored behavior comprise storing message responses, timing between event response and message and data formats of the first device.

15. The method as defined in claim 14, wherein the step of emulating the first device comprises comparing the message responses, timing variation and message and data formats of the first device to the second device.

16. The method as defined in claim 15, wherein the step of storing characteristics of the monitored behavior comprises storing the characteristics in an abstraction layer of the memory.

17. The method as defined in claim 12, wherein the second device comprises a vehicle device.

18. The method as defined in claim 17, wherein the vehicle device comprises a vehicle entertainment system.

19. The method as defined in claim 12 further comprising the steps of performing a pairing operation to communicate the test apparatus with the first device and further performing a sequence of actions.

20. The method as defined in claim 12, wherein the first device comprises a cell phone.

21. The method as defined in claim 12, wherein the test apparatus comprises a display, wherein the display provides an interface substantially similar to an interface on the first device so that a user may interface with the second device via the display to emulate the first device.

* * * * *